Patented Jan. 1, 1952

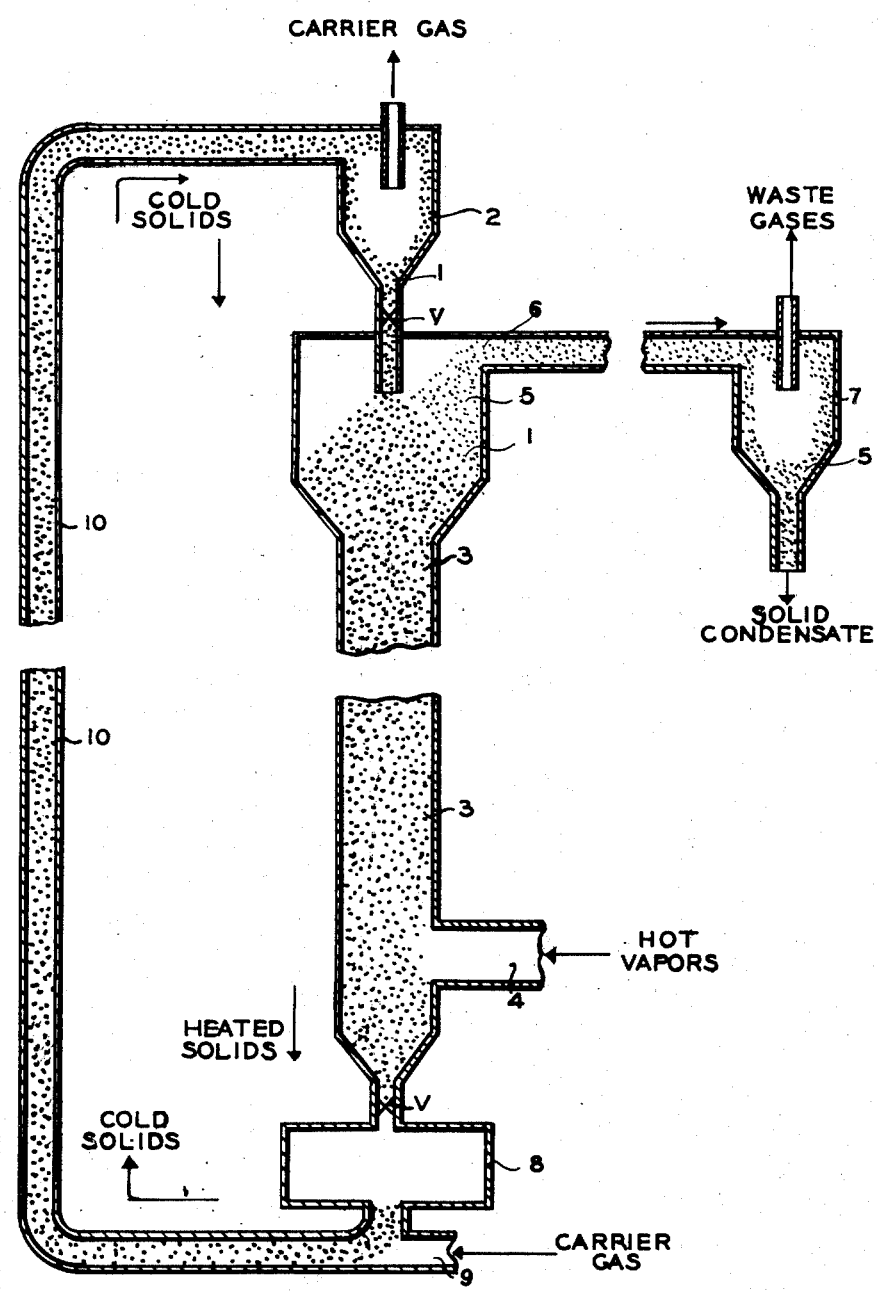

2,580,635

UNITED STATES PATENT OFFICE 2,580,635

CONDENSATION OF VAPORS

Charles Henry Winter, Jr., Wilmington, Del., assignor to E. I. du Pont de Nemours & Company, Wilmington, Del., a corporation of Delaware Application June 19, 1947, Serial No. 755,546

9 Claims. (Cl. 183—119)

This invention relates to methods and means for cooling hot gaseous materials, and more particularly to the condensation by cooling of those vaporous compounds which condense from the vapor directly to the solid phase. It further concerns the application thereto of certain fluidized solids techniques.

Many industrial operations require that a hot gas or mixtures of hot gases be rapidly cooled from high temperatures at which they might continue to react, to low temperatures where they are inactive. Often the rapidity with which such quenching is effected determines the accuracy with which the particular reaction can be controlled. It is also frequently desired to cool a hot vapor below its dew point, so that it condenses. There are several methods in use today for accomplishing these various results. One of them is to circulate the hot gases around metal tubes, the latter being cooled by passing a cold fluid through them. Heat transfer is effected between the hot gases and the cold tube surfaces. Such a method is highly undesirable where the vapor to be cooled condenses directly to a solid. The solid thus formed tends to deposit on the tube surfaces, thus insulating them and reducing greatly the heat exchange efficiency, and making necessary frequent shutdowns in operation for cleaning the equipment. Another commercial method for cooling is to mix with the hot material a cold inert gas. Large volumes of the latter are required, because of its low density, so that larger-scale and thus more expensive apparatus is required. The cooled material is highly diluted by the inert gas, so that subsequent recovery of the reaction products in concentrated forms is difficult and costly. It is obvious, then, that none of the methods presently used in industry is especially satisfactory in many instances.

It is accordingly an object of this invention to overcome the above and other disadvantages inherent in prior art methods. A further object is to quench hot gaseous materials very rapidly without effecting chemical reaction thereon. Another object is to cool large volumes of gases in relatively small-scale equipment. Yet another object is to effect such cooling under conditions which allow optimum heat exchange efficiency. A particular object is to effect the quenching and consequent condensation of various compounds which condense from the vapor directly to the solid state. Additional objects include the conversion of a hot gaseous mixture into a gaseous suspension of solid particles of one constituent thereof, as well as the separation therefrom of the condensed solid particles. Other objects will become apparent during perusal of the following discussion.

These objects are realized by the present invention which broadly comprises effecting contact between the hot vapors of a compound which condenses to a solid without passing through a definite liquid phase and relatively cool particles of a solid material which is inert thereto and which is at a temperature below the condensation point of the compound. The contact is implemented by causing the said vapors to flow in one direction in and around a stream of the said solids which is flowing countercurrently thereto. Heat transfer is effected, the hot vapors being cooled below their dew point, whereby they condense as solids, and the cold solids being correspondingly heated. The said condensate is withdrawn at one end of the zone of contact, while the added solids, heated by the exchange to a temperature above the dew point of the said condensate, are withdrawn at the opposite end.

A particular embodiment of the invention is shown in the accompanying drawing for purposes of illustration. Cold solids 1 from chamber 2 are dropped into chamber 3, passing downward therethrough by force of gravity. The hot vapors to be quenched, containing one or more compounds which condense directly from vapor to solid, are injected at inlet 4 near the base of chamber 3. These vapors pass upward through 3 countercurrent to the flow of the solids. They are gradually cooled during the ascent while the falling solids are simultaneously heated. At some point in the upper portion of 3, the particular vaporous compound to be recovered is quenched below its dew point and condenses in the form of finely divided solid particles 5. These are entrained in the uncondensed portion of the upwardly flowing gases and pass out of 3 at outlet 6. The two chambers designated as 2 and 7 may be any conventional separating means, such as cyclones. The condensate may be separated in 7 from the gases in which it is entrained. Meanwhile the heated solids may be simply discarded, or they may be dropped out of chamber 3 into 8, which represents schematically any desired cooling means commonly used to quench such materials. The process is then rendered continuous by cooling these solids in 8, injecting into them at inlet 9 an inert conveying gas, and recycling them through conduit 10 by means of this carrier into separator 2. There they are separated from the carrier gas, and are ready to be returned to chamber 3. The flow of solids throughout the system may be regulated by means of valves such as those designated as V. Instead of conveyance from chambers 8 to 2 by means of the inert carrier gas as shown in the drawing, this step may be wholly mechanical, the solids being recycled in a bucket elevator or the like. Many other variations in this and in the other salient features of the invention will be apparent to those skilled in the art, and all of them are to be deemed contemplated herein.

It is critical and essential to the process that the flow of cooling solids be countercurrent to the stream of vapor. The solids drop downward through the zone of contact by the force of gravity. The ascending vapors may be caused to flow at any desired velocity which is less than the rate of fall of the particles. The upward velocity of the vapors serves to buoy up the particles so that their speed is reduced. The downward progress of the solids thus resembles a "falling cloud" rather than a rapid stream. The magnitude of this effect of course depends on the particular velocity of the gas as well as the density and particle size of the solids. It is further necessary that the gas velocity be sufficient to support and convey out of the top of the chamber the solid condensate as it is formed. The nature of the solid condensate will naturally influence this factor. An especially satisfactory arrangement for many operations might be to allow cold solids which have a free settling rate of 15 feet per second to drop through the chamber, and to inject the hot vapors at a rate to give an upward velocity of roughly 1 to 14 or preferably 5 to 12 feet per second.

A particularly novel feature of this invention is that the added solids exist at a temperature above the dew point (or condensation point) of the vaporous compounds being condensed. This is a highly important consideration. Fluidized solids have not heretofore been employed to quench materials which condense directly into a solid, as the condensed solid becomes mixed with the cooling solid in such a manner that separation is usually difficult. It can be done, though, and the process is advantageous despite the difficulty, because of the improved heat transfer efficiency. It is certainly often less practical and more costly, however, than my present invention, which allows relatively easy separation and recovery of the constituents present. By having the flow of the two substances countercurrent and by so adjusting the temperature that the cooling solids become heated above the dew point of the condensate before they leave the chamber, it is now found that essentially no contaminating condensate exits with the said solids.

The particular cooling solids chosen will depend to a large extent on the character of the gases to be cooled. They must have essentially no chemical effect on the said gases, and must in turn be substantially unaffected themselves. It is also vital that the solid particles be of such weight and size that they will continue to flow downward through the conduit despite the opposing upward flow of the hot vapors. At the same time, the particles of solid condensate as formed must have a negative settling rate by comparison with them. Any substance meeting these requirements will usually be operable; and an especially satisfactory material for many operations is some form of silica, such as quartz sand or the like.

The mass ratio of solids to gas being cooled depends on the particle size, the amount of heat to be transferred, the velocity, amount and composition of the gas, as well as other factors. For a given mass of solids, for instance, the smaller the particles thereof the greater the cold surface area exposed, hence the more rapid the heat transfer.

Depending upon the conditions of temperature and pressure used in a given system, many gaseous compounds have the property of condensing directly from the vapor to the solid phase. The present process is operable to effect cooling and condensation of such compounds or of mixtures of two or more of them, or of their mixtures with other gases which have lower dew points. One useful application of the invention is for the partial condensation of a mixture of hot vapors, one of the components of which is of this nature, its temperature of condensation being higher than the dew points of the other constituents. When my novel process is used in such a situation, the temperature of the entering solids must of course be low enough to condense the desired material, but it must also be high enough to have no effect on the other vapors.

It is obvious that the solid particles of the resulting condensate must be of such aerodynamic properties that the upward movement which is imparted to them by the rising vapors is greater than the downward movement due to gravity. If this were not the case, the newly formed particles would tend to drop downward concurrently with the added solids so that there would be an accumulation of the condensed solids in the heat exchange chamber. The relative densities of the vapors and the condensate, the size and shape of the particles of the latter, the upward velocity of the vapors, and other similar factors must thus be taken into consideration.

The following examples are given simply in illustration of this invention and not in limitation thereof:

Example I

Equipment similar to that shown in the accompanying drawing was here employed in the separation of ferric chloride from a complex carrier gas. The hot vapors consisted of a mixture of ferric chloride with free chlorine, nitrogen and oxygen. Analysis of these vapors showed 34.2% by weight of iron chloride, 33.6% $Cl_2$, 31.0% $N_2$, and 1.2% $O_2$. The vapors entered chamber 3 at inlet 4 and progressed upward through it at an initial volume of 785 cubic feet per minute. They were at a temperature of 800° C.; estimated enthalpy was 343,200 P. C. U. per hour. (1 P. C. U. is the amount of heat required to raise the temperature of 1 pound of water 1° C., and 1 P. C. U.=1.8 B. t. u.) Quartz sand I having an average particle diameter of about 700 microns was allowed to drop into chamber 3 from cyclone separator 2 and to flow downward therethrough by force of gravity. The sand entered at the top at a temperature of 70° C. Heat exchange occurred between the downwardly flowing sand and the upwardly flowing iron chloride mixture. The latter was cooled until it exited at outlet 6 at a temperature of 100° C., having then an enthalpy estimated at only 23,000 P. C. U. per hour. The ferric chloride content thereof was condensed as a finely divided solid 5, since its dew point in this particular gaseous mixture was approximately 260° C. This condensate, entrained in the gaseous chlorine, nitrogen, and oxygen, passed into cyclone separator 7, where the non-condensible gases were removed and the solid iron chloride recovered. Meanwhile, the cooling solids became heated in their passage downward through chamber 3 until at the base they exited at a temperature of 350° C. Since this temperature was above the dew point of the iron chloride, essentially none of the latter was present in the withdrawn solids. Any which might have been carried down had been revaporized as the temperature rose, and the vapors had ascended again through 3 to be cooled and recondensed by additional cold solids as they approached the upper outlet, and finally carried over into separator 7. The hot solids at 350° C. were bled out of chamber 3 into cooling means 8. In the present experiment, 8 consisted of a screw-conveyor having spray atomizers located above it. Cold water was injected through these atomizers and, falling on the hot solids, quenched them to a temperature of about 120° C. In so doing, the water itself was evaporated, so that the finally cooled solids were substantially dry. At the end of the screw-conveyor the solids entered a stream of air injected at inlet 9, which air served to convey them upward through line 10 back into cyclone separator 2, also cooling them still further to about 70° C. In 2 the conveying air was removed and the cold solids were ready to be bled off back into chamber 3 to effect quenching of additional quantities of the hot vapors.

Example II

The apparatus of Example I was again employed, this time to separate a mixture of ferric chloride and aluminum chloride vapors by fractional condensation. The mixture entered chamber 3 at a temperature of 700° C., to be contacted therein by a countercurrently flowing mass of quartz sand having a particle size of about 20-mesh. This sand entered the chamber at a temperature of 180° C., and after heat exchange with the mixed vapors exited at 400° C. The vapors meanwhile were cooled by the exchange to about 250° C., whereby their ferric chloride content was condensed to fine crystals which were entrained in the vapors of aluminum chloride. The resulting gaseous suspension passed into separator 7, which was maintained at about 250° C. also. The aluminum chloride vapor was unaffected by the operation, as its condensation point at 1 atmosphere of pressure is about 178° C. The ferric chloride, however, was efficiently condensed; the final aluminum chloride vapor contained ferric chloride to the extent of only 5 mm. Hg partial pressure. Hence separation of the two halides was essentially complete.

Example III

Ilmenite ore (a ferro-titaniferous ore) was treated with carbon and chlorine at 800° C. A mixture of metal chlorides was thus formed and vaporized, the mixture being predominantly titanium tetrachloride, oxides of carbon, and iron chlorides. The $TiCl_4$ was to be subsequently oxidized to prepare $TiO_2$ pigment; but before this could be done, it was necessary to separate it from the impurities, particularly iron chloride. To effect this separation, the mixed vapors at 800° C. were contacted, as in Examples I and II, with quartz sand at a temperature of 130° C. The chloride vapors passed upward through chamber 3 while the sand flowed countercurrently downward. Heat exchange occurred, the vapors being cooled to 150° C., which temperature was below the condensation point of the iron chloride but above the point at which titanium chloride would be affected. The iron chloride was thus condensed as fine crystals suspended in the $TiCl_4$ vapor. This suspension was separated into its component parts in chamber 7, which was itself heated to 150° C., and the thus-purified $TiCl_4$ vapor was ready to be oxidized.

There are many advantages to be gained by the use of this fluidized solids technique. A larger cold surface area is provided than in other processes, giving higher rate of heat transfer in minimum size of equipment. In addition, novel means are thus provided for effecting quenching and condensation of vaporous materials which pass directly from the gaseous to the solid state, and would in other operations condense on and pass out of the system with the cooling solids, thereby contaminating them and rendering subsequent separation and recovery difficult.

The present operation is thus far more effective and less costly than those disadvantageous processes heretofore employed. Accordingly, the invention will find use in many widely varied operations. A particularly valuable application is for the fractional condensation of mixtures of vapors, at least one of which condenses directly to the solid state, as for instance: nickel chloride, chromic chloride, ammonium chloride, germanium oxide, germanium sulphide, arsenic oxide, mercurous bromide, ammonium bromide, iodine, various organic compounds, as well as ferric chloride, aluminum chloride and the like. As explained above, in the halogenation of ores, there are formed product gases which comprise halides of the various metallic constituents of the ores. It is necessary to separate these, prior to their oxidation, in order that the final metal oxide pigments may be pure. According to the present invention, these mixed halide vapors are injected upward into a chamber countercurrently to the downward flow of cold solids, and are thus cooled. Those metal halides which condense directly from the gaseous to the solid state at a substantially higher temperature than the dew point or condensation temperature of the other components will appear as solids and may then be removed. The process may be used to condense essentially any vapor which at the particular conditions of temperature and pressure will form a solid directly. It is also useful to separate into their component parts mixtures of almost any two or more gases, at least one of which condenses in this fashion. The separation of phthalic anhydride and naphthalene is a case in point.

The fluidized solids method need not be used alone, but may instead be employed in conjunction with other well known cooling means. For instance, its combination with a conventional tubular heat exchanger may at times be advantageous. Cooling is thus effected even more rapidly.

I claim:

1. A method for fractionally condensing and separating from a vaporous mixture a constituent which condenses directly to a solid to form a gaseous suspension of said constituent in the remaining vapors, which comprises countercurrently contacting for heat exchange a stream of the said mixture and a stream of sufficient nonreactive finely divided cooler solids to cool said constituent to below its condensation point, maintaining the heat exchange zone at such temperature that said solids become heated to above the dew point of the resulting condensate, withdrawing the condensed constituent as a suspension in the uncondensed gases and recovering it therefrom, and separately removing the finely divided added solids.

2. A continuous method for separating from a vaporous mixture a constituent which condenses directly to a solid to form a gaseous suspension of said constituent in the remaining vapors, which comprises countercurrently contacting a stream of the said vaporous mixture with a stream of sufficient cooler finely divided non-reactive solids to cool said constituent to below its condensation point, maintaining the heat exchange zone at such temperature that said solids become heated to above the dew point of the resulting condensate, continuously withdrawing the cooled gaseous mixture at a temperature below the condensation point of the said constituent, separating the resulting condensate therefrom, and continuously and separately withdrawing the added solids at a temperature above the said condensation temperature.

3. A continuous method for the conversion of a vaporous mixture, having a constituent which condenses directly to the solid state, into a gaseous suspension of said constituent in the remaining vapors, which method comprises countercurrently directing a stream of the vaporous mixture into a direct contact with a stream of sufficient finely divided non-reactive cooler solids to cool said constituent to below its condensation point, maintaining the heat exchange zone at such temperature that said solids become heated to above the dew point of the resulting condensate, withdrawing the resulting gaseous suspension from the upper portion of the heat transfer chamber and removing the heated finely divided solids from the bottom of the chamber at a temperature above the condensation temperature of said constituent, externally cooling said solids and returning same to the condensing system for reuse.

4. A method for separating from a mixture of vapors a metal halide constituent which condenses directly to a solid to form a gaseous suspension of said solid in the remaining vapors, which comprises directing a stream of the said mixture into a countercurrently moving stream of non-reactive finely divided cooler solids sufficient to cool said constituent to below its condensation point, maintaining the heat exchange zone at such temperature that said solids become heated to above the dew point of the resulting condensate, withdrawing the said constituent as a solid condensate suspended in the uncondensed vapors and recovering it therefrom, and separately removing the finely divided added solids.

5. A process for converting a vaporous mixture, containing a compound which condenses direct to the solid state, into a gaseous suspension of said compound in the remaining vapors, which comprises flowing said vaporous mixture into a cooling zone, therein contacting it with cooler, finely-divided, non-reactive solids flowing in a direction opposite to the direction of flow of said mixture sufficient to cool said compound to below its condensation point, maintaining the contacting zone at such temperature that said solids are heated above the dew point of the resulting condensate, maintaining a gas velocity on said mixture sufficient to support and convey out of said zone solid condensate formed as a result of said contact, and thereafter subjecting the gaseous suspension from said cooling zone to separation to recover its constituents.

6. A method for condensing iron chloride vapors from a vaporous admixture which comprises passing said vapors in admixture with a relatively non-condensable carrier gas, upwardly through a cooling zone countercurrent to and in direct heat exchange relationship with a downwardly flowing stream of cooler, finely-divided, non-reactive solid particles sufficient to cool said vapors below the condensation point of said iron chloride and to heat said solids to a temperature above the condensation point of said iron chloride, withdrawing the resulting gaseous suspension from the upper portion of said cooling zone as solid iron chloride entrained in the carrier gas, withdrawing the heated non-reactive solid particles from the lower portion of said zone, and separating and recovering the solid iron chloride from the entraining carrier gas.

7. A method for separating titanium chloride vapors from their admixture with vaporous ferric chloride, comprising passing said vaporous mixture into a cooling zone countercurrent to a moving stream of sufficient non-reactive, finely-divided cooler solids being concurrently introduced into said zone to cool said ferric chloride to below its condensation point while maintaining a temperature within the heat exchange zone sufficient to heat said solids above the ferric chloride dew point, withdrawing from said zone at a temperature below the condensation point of said ferric chloride but above the condensation point of said titanium tetrachloride the resulting treated vapors and as a gaseous suspension of condensed solid ferric chloride, separating and recovering said solid ferric chloride condensate and the uncondensed titanium tetrachloride vapors, and separately recovering from said zone at a temperature above the condensation point of said ferric chloride the finely-divided cooler solids added thereto.

8. A process for converting a vaporous mixture, containing a constituent which condenses directly to the solid state, into a gaseous suspension of said constituent in the remaining vapors, which comprises flowing a stream of said vaporous mixture into and upwardly through a cooling zone, concurrently therewith downwardly flowing through said zone sufficient cooler, finely-divided, non-reactive solids which have a free settling rate of 15 feet per second to cool said constituent to below its condensation point while maintaining a temperature within the heat exchange zone sufficient to heat said solids above the dew point of the resulting condensate, maintaining on said vapors an upward velocity flow rate ranging from about 1–14 feet per second to suspend the condensed solid constituent as formed in the remaining vapors, and thereafter separating and recovering said condensed constituent from said remaining vapors upon discharge of the suspension from said cooling zone.

9. A process for separating titanium tetrachloride vapors from an admixture with vaporous ferric chloride which comprises flowing said vaporous mixture upwardly through a cooling zone and at a velocity ranging from 5–12 feet per second, countercurrent to a descending stream of sufficient cooler, finely-divided, non-reactive solids having a free settling rate of 15 feet per second through said zone to cool said ferric chloride to below its condensation point while maintaining a temperature within the heat exchange zone to heat said solids to above the dew point of said titanium tetrachloride, continuously withdrawing from said zone the vapors treated therein and in the form of a gaseous suspension of condensed solid ferric chloride, separating said ferric chloride condensate therefrom, and continuously and separately withdrawing from said zone the non-reactive, finely-divided cooler solids introduced therein and at a temperature above the condensation temperature of said ferric chloride.

CHARLES HENRY WINTER, JR.

REFERENCES CITED

The following references are of record in the file of this patent:

UNITED STATES PATENTS

| Number | Name | Date |
|---|---|---|
| 2,245,077 | Muskat et al. | June 10, 1941 |
| 2,306,184 | Pechukas | Dec. 22, 1942 |
| 2,475,255 | Rollman | July 5, 1949 |

FOREIGN PATENTS

| Number | Country | Date |
|---|---|---|
| 525,197 | Great Britain | Aug. 23, 1940 |